(12) United States Patent
Lee et al.

(10) Patent No.: US 12,194,550 B2
(45) Date of Patent: Jan. 14, 2025

(54) CUTTING INSERT AND CUTTING TOOL EQUIPPED WITH THE SAME

(71) Applicant: KORLOY INC., Seoul (KR)

(72) Inventors: Nam Seon Lee, Cheongju-si (KR); Ki Chan Nam, Cheongju-si (KR); Min Seok Oh, Cheongju-si (KR)

(73) Assignee: KORLOY INC., Seoul (KR)

( * ) Notice: Subject to any disclaimer, the term of this patent is extended or adjusted under 35 U.S.C. 154(b) by 406 days.

(21) Appl. No.: 17/765,051

(22) PCT Filed: Aug. 26, 2020

(86) PCT No.: PCT/KR2020/011376
§ 371 (c)(1),
(2) Date: Mar. 30, 2022

(87) PCT Pub. No.: WO2021/085826
PCT Pub. Date: May 6, 2021

(65) Prior Publication Data
US 2022/0395915 A1 Dec. 15, 2022

(30) Foreign Application Priority Data
Oct. 28, 2019 (KR) .......................... 10-2019-0134566

(51) Int. Cl.
*B23C 5/22* (2006.01)
*B23C 5/00* (2006.01)
*B23C 5/06* (2006.01)

(52) U.S. Cl.
CPC ............ *B23C 5/2213* (2013.01); *B23C 5/006* (2013.01); *B23C 5/06* (2013.01); *B23C 5/22* (2013.01);
(Continued)

(58) Field of Classification Search
CPC ............ B23C 5/2239; B23C 2200/045; B23C 2200/125; B23C 2200/128;
(Continued)

(56) References Cited

U.S. PATENT DOCUMENTS 5,346,336 A * 9/1994 Rescigno ............ B23B 27/1622
407/104
5,443,334 A * 8/1995 Pantzar .................... B23C 5/202
407/42

(Continued)

FOREIGN PATENT DOCUMENTS

EP 1800779 A2 * 6/2007 ............... B23C 5/06
EP 2705917 A2 * 3/2014 ............... B23C 5/06
(Continued)

*Primary Examiner* — Sara Addisu
(74) *Attorney, Agent, or Firm* — Rabin & Berdo, P.C.

(57) ABSTRACT

A cutting insert according to an embodiment of the present disclosure relates to a circular double-sided cutting insert including a top surface, a bottom surface, a lateral surface, and a cutting edge, and mounted to a cutting tool, in which a plurality of clearance surfaces and a plurality of fastening surfaces are located on the lateral surface, and among the plurality of fastening surfaces, a fastening surface, which is brought into contact with the cutting tool upon mounting of the cutting insert to the cutting tool, forms an acute angle with respect to the top surface or the bottom surface acting as a rake surface.

7 Claims, 12 Drawing Sheets

(52) U.S. Cl.
CPC ...... *B23C 5/2239* (2013.01); *B23C 2200/045* (2013.01); *B23C 2200/125* (2013.01); *B23C 2200/128* (2013.01)

(58) Field of Classification Search
CPC ........ B23C 2200/203; B23C 2200/369; B23C 5/2213; B23C 5/006; B23C 5/06; B23C 5/22; B23C 5/02; B23C 5/20
See application file for complete search history.

(56) References Cited

U.S. PATENT DOCUMENTS

| | | | | |
|---|---|---|---|---|
| 6,050,751 A * | 4/2000 | Hellstrom | ........... | B23B 27/1622 407/103 |
| 6,152,658 A * | 11/2000 | Satran | ........... | B23B 27/00 407/120 |
| 6,164,878 A * | 12/2000 | Satran | ........... | B23C 5/2213 407/103 |
| 6,238,133 B1 * | 5/2001 | DeRoche | ........... | B23C 5/2213 407/34 |
| 6,607,334 B2 * | 8/2003 | Satran | ........... | B23C 5/2213 407/113 |
| 7,255,518 B2 * | 8/2007 | Wallstrom | ........... | B23C 5/2208 407/103 |
| 9,144,848 B2 * | 9/2015 | Konta | ........... | B23C 5/109 |
| 9,550,239 B2 * | 1/2017 | Yamamoto | ........... | B23C 5/202 |
| 9,782,831 B2 * | 10/2017 | Lenischenko | ........... | B23B 27/22 |
| 2002/0168235 A1 * | 11/2002 | Johnson | ........... | B23C 5/006 407/43 |
| 2003/0059262 A1 * | 3/2003 | Men | ........... | B23C 5/2213 407/35 |
| 2005/0084342 A1 * | 4/2005 | Festeau | ........... | B23C 5/202 407/113 |
| 2005/0111925 A1 * | 5/2005 | Svenningsson | ........... | B23C 5/2213 407/48 |
| 2006/0245837 A1 * | 11/2006 | Dufour | ........... | B23C 5/06 407/48 |
| 2007/0183857 A1 * | 8/2007 | Wihlborg | ........... | B23C 5/2204 407/67 |
| 2010/0054873 A1 * | 3/2010 | Men | ........... | B23C 5/2213 407/42 |
| 2010/0202839 A1 * | 8/2010 | Fang | ........... | B23C 5/202 407/53 |
| 2011/0091294 A1 * | 4/2011 | Michelet | ........... | B23C 5/06 407/65 |
| 2012/0051853 A1 * | 3/2012 | Scandroglio | ........... | B23B 27/1611 407/100 |
| 2012/0070239 A1 * | 3/2012 | Park | ........... | B23C 5/06 407/42 |
| 2012/0076596 A1 * | 3/2012 | Kim | ........... | B23C 5/1027 407/69 |
| 2012/0301235 A1 * | 11/2012 | Yoshioka | ........... | B23C 5/2213 407/115 |
| 2013/0129436 A1 * | 5/2013 | Hoffer | ........... | B23C 5/2213 407/102 |
| 2013/0156515 A1 * | 6/2013 | Satran | ........... | B23C 5/202 407/113 |
| 2013/0330135 A1 * | 12/2013 | Burtscher | ........... | B23C 5/202 407/42 |
| 2013/0336732 A1 * | 12/2013 | Jansson | ........... | B23C 5/06 407/113 |
| 2014/0003874 A1 * | 1/2014 | Riviere | ........... | B23C 5/202 407/64 |
| 2014/0072377 A1 * | 3/2014 | Sunnvius | ........... | B23C 5/06 407/42 |
| 2014/0219734 A1 * | 8/2014 | Hoffer | ........... | B23C 5/003 29/428 |
| 2014/0348600 A1 * | 11/2014 | Matsubara | ........... | B23C 5/06 407/64 |
| 2016/0271707 A1 * | 9/2016 | Lee | ........... | B23C 5/202 |
| 2018/0001399 A1 * | 1/2018 | Kister | ........... | B23C 5/2226 |
| 2019/0255622 A1 * | 8/2019 | Hecht | ........... | B23B 27/1622 |
| 2019/0344363 A1 * | 11/2019 | Bonhoure | ........... | B23C 5/2213 |
| 2021/0379679 A1 * | 12/2021 | Bonenfant | ........... | B23C 5/06 |
| 2022/0105578 A1 * | 4/2022 | Rue | ........... | B23C 5/2213 |
| 2022/0288705 A1 * | 9/2022 | Fang | ........... | B23C 5/2213 |
| 2022/0288706 A1 * | 9/2022 | Shikama | ........... | B23C 5/2213 |

FOREIGN PATENT DOCUMENTS

| | | | | |
|---|---|---|---|---|
| JP | 2001079708 A | * | 3/2001 | ............ B23C 5/109 |
| KR | 1020100124637 A | | 11/2010 | |
| KR | 101509417 B1 | | 4/2015 | |
| KR | 101674697 B1 | | 11/2016 | |
| KR | 101700703 B1 | | 1/2017 | |
| WO | WO-2010023659 A1 | * | 3/2010 | ............ B23B 27/16 |
| WO | WO-2012131896 A1 | * | 10/2012 | ............ B23C 5/06 |
| WO | WO-2013037475 A1 | * | 3/2013 | ............ B23C 5/2221 |

\* cited by examiner

Section A-A

Section B-B

CUTTING INSERT AND CUTTING TOOL EQUIPPED WITH THE SAME

BACKGROUND

Technical Field

The present disclosure relates to a cutting insert and a cutting tool equipped with the same.

Background Art

Generally, a cutting insert is fastened to a cutting tool mounted to a machine tool and is used for cutting a workpiece such as a machine part and so on that is made of iron, non-ferrous metal, non-metal material, and so on.

Such a cutting insert includes a top surface, a bottom surface oriented in the opposite direction, a lateral surface connecting the top surface and the bottom surface to each other, and a cutting edge (cutting blade) for cutting the workpiece.

FIG. 12 illustrates a cutting insert disclosed in Korean Patent Application Laid-Open No. 2010-0124637 as an example of a related cutting insert. For reference, FIG. 12 corresponds to FIG. 3 of the Korean Patent Application Laid-Open mentioned above, and for convenience of explanation, the reference numerals used in the above Korean Patent Laid-Open Publication are used as they are without modification. In addition, reference numerals used in FIG. 12 do not refer to the same components even when they duplicate with reference numerals used in the description of the present disclosure to be described below.

Such a related cutting insert is a so-called R-type indexible insert which has top and bottom surfaces formed in a circular shape and thus is very vulnerable to rotation when a cutting load is applied to the cutting edge during cutting process. In addition, when the insert is rotated while cutting is performed, the seating part of the cutting tool (tool holder) equipped with the cutting insert suffers abrasion and a decrease in fastening force. In addition, as this inevitably causes vibration and sudden breakage in the cutting tool, a stable tool life cannot be ensured. In addition, recent R-type cutting inserts are mainly manufactured in a double-sided type to improve economic feasibility, and for this reason, as described above, the problem of the decrease in fastening force with the cutting tool is exacerbated.

SUMMARY

Technical Problem

The present disclosure has been made to overcome the problems mentioned above, and it is an object of the present disclosure to provide a cutting insert that can be stably fastened to a cutting tool and can ensure uniform fastening force on both upper and bottom surfaces.

Technical Solution

In order to achieve the objectives described above, a cutting insert according to an embodiment of the present disclosure relates to a circular double-sided cutting insert including a top surface, a bottom surface, a lateral surface, and a cutting edge, and mounted to a cutting tool, in which a plurality of clearance surfaces and a plurality of fastening surfaces are located on the lateral surface, among the plurality of fastening surfaces, a fastening surface, which is brought into contact with the cutting tool upon mounting of the cutting insert to the cutting tool, forms an acute angle with respect to the top surface or the bottom surface acting as a rake surface, the cutting edge includes a minor cutting edge and a major cutting edge connected to the minor cutting edge, and the major cutting edge is extended from one end of the minor cutting edge and is inclined downward to be closer toward a transverse central axis of the cutting insert as being farther away from the one end of the minor cutting edge.

In addition, the plurality of fastening surfaces are formed in even number which is 6 or more, and half of the fastening surfaces form an acute angle with respect to the top surface, and the other half of the fastening surfaces form an acute angle with respect to the bottom surface.

In addition, each of the half of the fastening surfaces forming an acute angle with respect to the top surface is adjacent to each of the other half of the fastening surfaces forming an acute angle with respect to the bottom surface.

In addition, a width of the half of the fastening surfaces forming an obtuse angle with respect to the top surface is increased toward the top surface, a width of the half of the fastening surfaces forming an obtuse angle with respect to the bottom surface is increased toward the bottom surface, and a transition section is formed at a boundary between the plurality of fastening surfaces and the plurality of clearance surfaces such that the plurality of fastening surfaces form a step with the plurality of clearance surfaces.

In addition, the bottom surface of the cutting insert as viewed from the bottom surface has a shape of being relatively rotated by a predetermined angle about a longitudinal central axis of the cutting insert with respect to the top surface of the cutting insert as viewed from the top surface.

In addition, the predetermined angle is 45 degrees.

In addition, the cutting insert includes a minor cutting edge and a major cutting edge connected to the minor cutting edge, the minor cutting edge clearance surface is provided below the minor cutting edge, and the fastening surface is located below the minor cutting edge clearance surface.

In addition, the minor cutting edge is a straight line when the cutting insert is viewed from above the top surface or the bottom surface.

In addition, the other end of the fastening surface is connected to a surface of the cutting insert without a step.

Advantageous Effects

The cutting insert having the configuration described above according to an embodiment of the present disclosure has the following effects.

Upon fastening of the cutting insert to the cutting tool, it is possible to achieve a wedge-shaped fastening structure, thereby ensuring a very strong clamping force.

Since the width of the fastening surface is increased as being closer toward the rake surface, it is possible to minimize the amount of material removed by the cutting insert, and thus prevent a decrease in overall rigidity of the cutting insert.

In addition, since the fastening surface can be formed below the clearance surface of the minor cutting edge, and these shapes can be equally arranged along the side, the fastening surface can always be located below the minor cutting edge, and a uniform fastening force with the cutting tool can be ensured.

Meanwhile, it goes without saying that the present disclosure includes other effects, although not explicitly stated, that can be expected from the configuration described above.

DETAILED DESCRIPTION

Hereinafter, preferred embodiments of the present disclosure will be described in detail with reference to the accompanying drawings, which will be readily apparent to those skilled in the art to which the present disclosure pertains. However, the description proposed herein is just a preferable example for the purpose of illustrations only, and not intended to limit the scope of the disclosure, so it should be understood that other equivalents and modifications could be made thereto without departing from the scope of the disclosure.

Figure 1A:
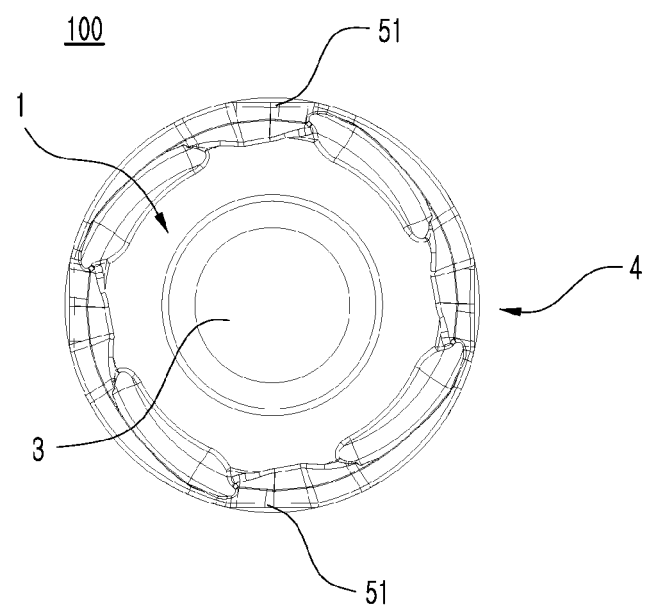
FIG. 1A is a plan view of a cutting insert according to an embodiment of the present disclosure.
Figure 1B:
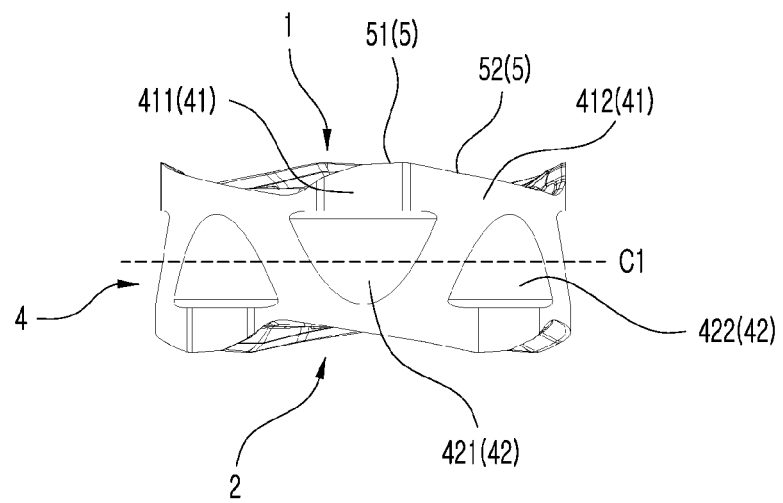
FIG. 1B is a front view thereof.

FIG. 1A is a top plan view of a cutting insert 100 according to an embodiment of the present disclosure, and FIG. 1B is a front view of the cutting insert 100.

The cutting insert 100 is a double-sided cutting insert mounted to a cutting tool 200, and includes a top surface 1, a bottom surface 2, and a lateral surface 4. In addition, a through hole 3 is formed through from the bottom surface 2 to the top surface 1, to receive a fastening bolt F to be mounted therein upon fastening of the cutting tool.

As illustrated in FIG. 1, the top surface 1 and the bottom surface 2 may be formed in a substantially circular shape in a plan view of the cutting insert 100 that is viewed from above the top surface 1 or the bottom surface 2. In addition, the cutting insert 100 is a double-sided cutting insert that allows the top surface 1 and the bottom surface 2 to be used as rake surfaces, respectively.

A plurality of clearance surfaces 41 and a plurality of fastening surfaces 42 are located on the lateral surface 4. By way of example, there are eight fastening surfaces 42 formed in the present embodiment.

Meanwhile, among the plurality of fastening surfaces 42, a fastening surface, which is brought into contact with the cutting tool upon mounting of the cutting insert 100 to the cutting tool, forms an acute angle with respect to the top surface 1 or the bottom surface 2 acting as the rake surface. That is, these fastening surfaces are formed as a so-called reversely positive type. For reference, these fastening surfaces are referred to as a positive type when they form an obtuse angle, and referred to as a negative type when they form a right angle.

Figure 3A:
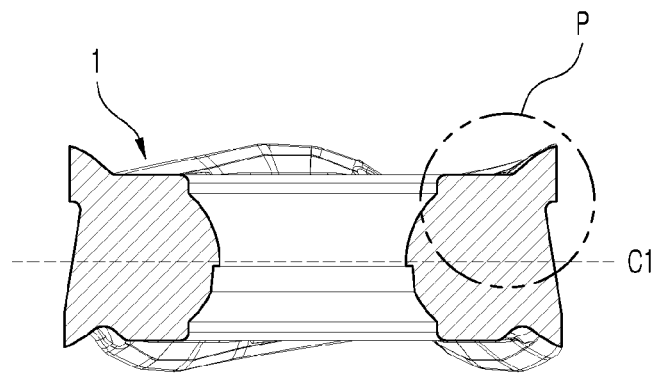
FIG. 3A is a cross-sectional view taken along the line A-A in FIG. 2.
Figure 4:
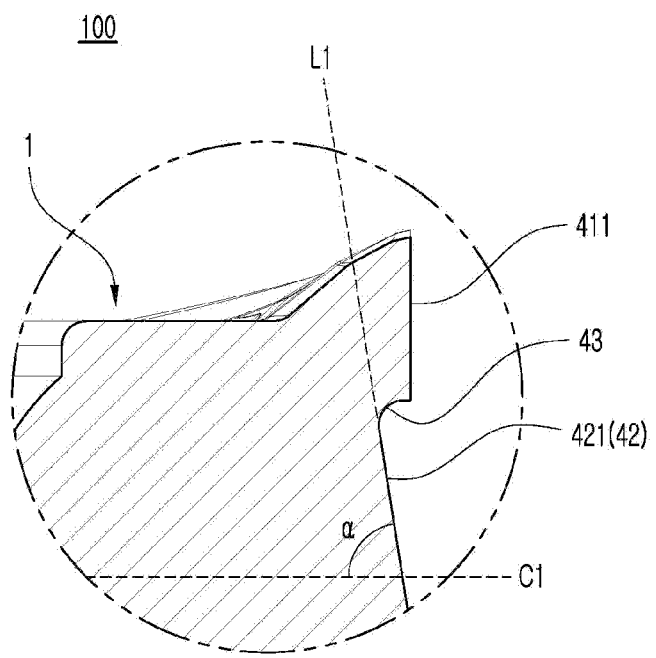
FIG. 4 is an enlarged diagram illustrating an encircled part P of FIG. 3A.

Specifically, as illustrated in FIGS. 3A and 4, when the top surface 1 acts as a rake surface, that is, when it acts as a rake surface on which chips ride and flow during cutting process, the fastening surface 421, 42 forms an acute angle α with respect to a transverse center line C1 of the cutting insert 100 In this example, the angle formed by the fastening surface 421 and the transverse center line C1 of the cutting insert 100 refers to an angle α of the portion facing the top surface 1, among the angles of intersections formed by an extension line L1 of the fastening surface 421 and the transverse center line C1 of the cutting insert.

Figure 3B:
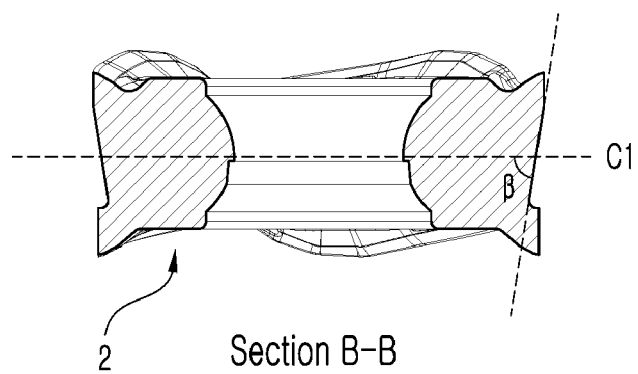
FIG. 3B is a cross-sectional view taken along the line B-B in FIG. 2.

Likewise, as illustrated in of FIG. 3B, when the bottom surface 2 acts as a rake surface, the fastening surface 422, 42 forms an acute angle β with respect to the transverse center line C1 of the cutting insert 100. These acute angles (α, β) are preferably equal to each other.

Meanwhile, for the plurality of fastening surfaces 42, there may be an even number of fastening surfaces 42, which may be 6 or more. Since the cutting insert 100 according to the present embodiment is a double-sided cutting insert, by considering its use, the number of corners used should be increased compared to a single-sided cutting insert using four corners. Accordingly, when considering that a total of 6 corners can be used only when at least 3 or more corners can be used based on the upper and bottom surfaces, the double-sided cutting insert has economical efficiency compared to the single-sided 4-corner cutting insert. Accordingly, a total of 6 or more fastening surfaces 42 should be provided in order to use 3 corners based on the top surface and 3 corners based on the bottom surface. For reference, in the present embodiment, there are 8 fastening surfaces 42 formed, for example, such that a total of 8 corners including 4 corners based on the top surface and 4 corners based on the bottom surface can be used.

In addition, half of the fastening surfaces 421 form an acute angle α with respect to the top surface 1, and the other half of the fastening surfaces 422 form an acute angle β with respect to the bottom surface 2.

In addition, as illustrated in FIG. 1B, each of the half of the fastening surfaces 421 forming an acute angle α with respect to the top surface 1 is adjacent to each of the other half fastening surfaces 422 forming an acute angle β with respect to the bottom surface 2. That is, the fastening surfaces 422 are located on both sides of the fastening surface 421, and the fastening surfaces 421 are located on both sides of the fastening surface 422.

Figure 5:
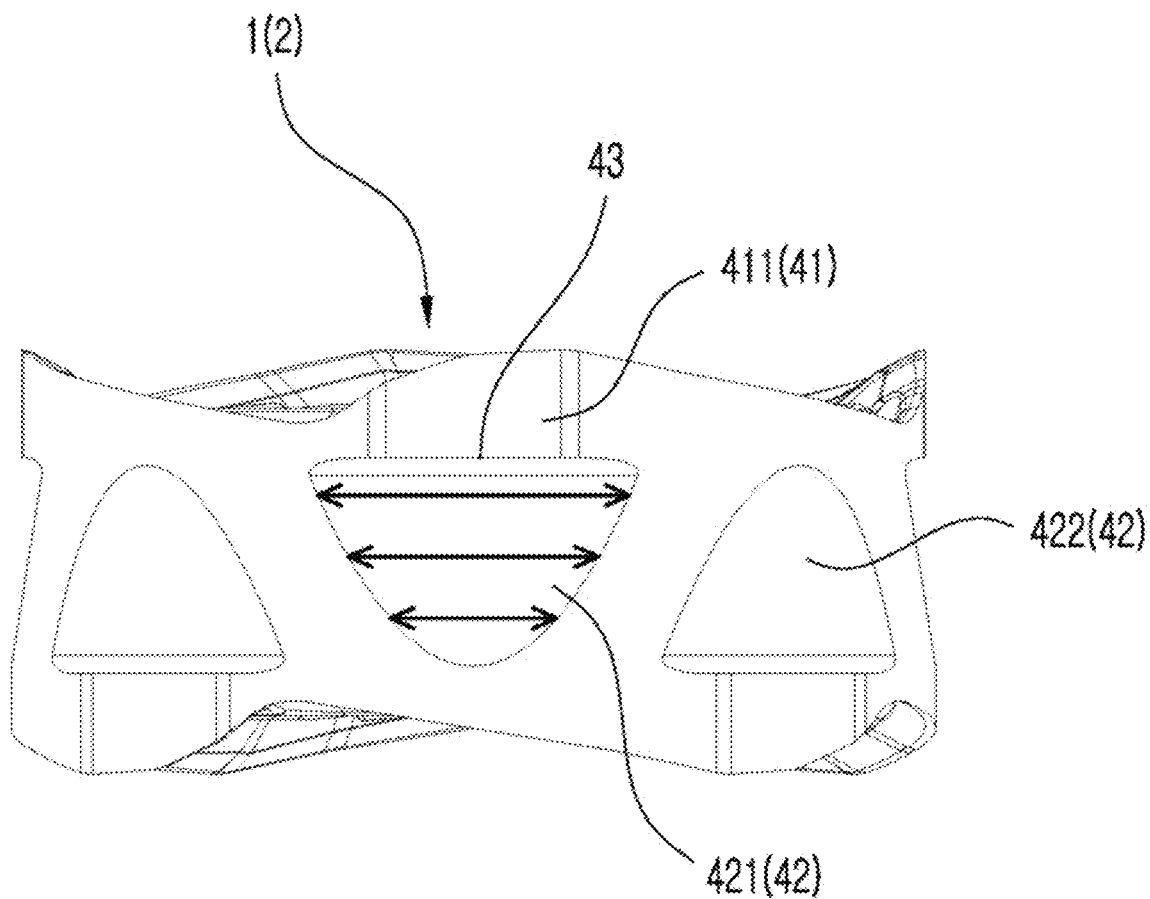
FIG. 5 is a view for explaining a width of a fastening surface of the cutting insert of FIG. 1.

Meanwhile, as illustrated in FIG. 5, regarding the fastening surface 42, when the cutting insert is arranged such that surface acting as a rake surface is located above, the fastening surface 421 is increased in width in an upward direction. For example, when the top surface 1 acts as a rake surface, the fastening surface 421 is increased in width as being closer toward the top surface 1, and when the bottom surface 2 acts as a rake surface, the fastening surface 422 is increased in width as being closer toward the bottom surface 2. Accordingly, when manufacturing the cutting insert, it is possible to minimize an amount of materials removed and thus prevent a decrease in overall rigidity of the cutting insert. Unlike the cutting insert 100 of the present embodiment, if the width of the fastening surface 42 is uniformly formed in the upper and lower directions of the cutting insert, the amount of material removed by the cutting insert is relatively increased, resulting in the problem of a decrease in the rigidity of the cutting insert.

In addition, in this cutting insert, as illustrated in FIGS. 4 and 5, a transition section 43 is formed at a boundary between the fastening surface 421 and a clearance surface 411, forming a step. This transition section 43 is provided such that the fastening surface 421 is formed flat to increase the fastening stability with the cutting tool. Through this, one end of the fastening surface 421 forms a step with respect to the clearance surface 411, and the other end on the opposite side is connected to the surface (the lateral surface) of the cutting insert without a step. Accordingly, the amount of material removed can be minimized when the fastening surface 421 is formed, so that it can be implemented without compromising the rigidity of the cutting insert.

Figure 8A:
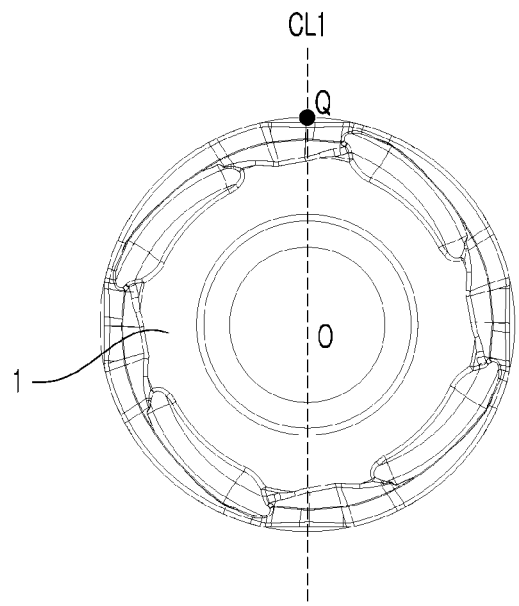
FIG. 8A is a top plan view of the cutting insert of FIG. 1.
Figure 8B:
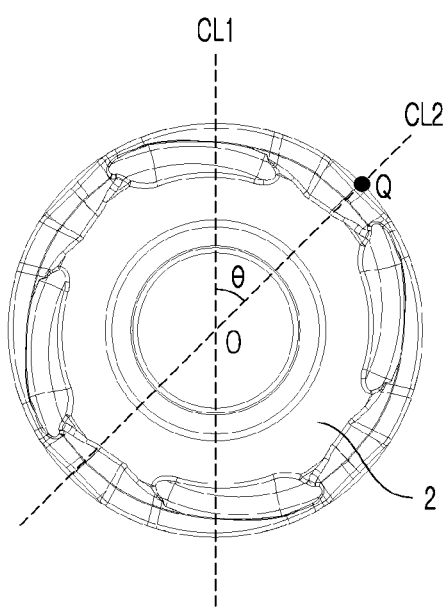
FIG. 8B is a bottom plan view of the cutting insert of FIG. 1.

In addition, as illustrated in FIGS. 1 and 8, in the cutting insert 100, a minor cutting edge clearance surface 411 is extended downwardly from a minor cutting edge 51 in the height direction of the cutting insert 100, in which the bottom surface 2 may be rotated relatively with respect to the top surface 1 by a predetermined angle θ and positioned. Here, the angle θ may be exemplarily set in advance between 10° and 60°, and preferably to 45°. For reference, FIG. 8A is a top plan view of the cutting insert of FIG. 1, and FIG. 8B illustrates a bottom plan view of the cutting insert of FIG. 1, respectively, in which a line CL1 represents a vertical line vertically crossing the center of the cutting insert, and a line CL2 represents a line connecting a point Q to which a specific point O of the cutting insert 100 is relatively rotated, with the center point O of the cutting insert.

Figure 2:
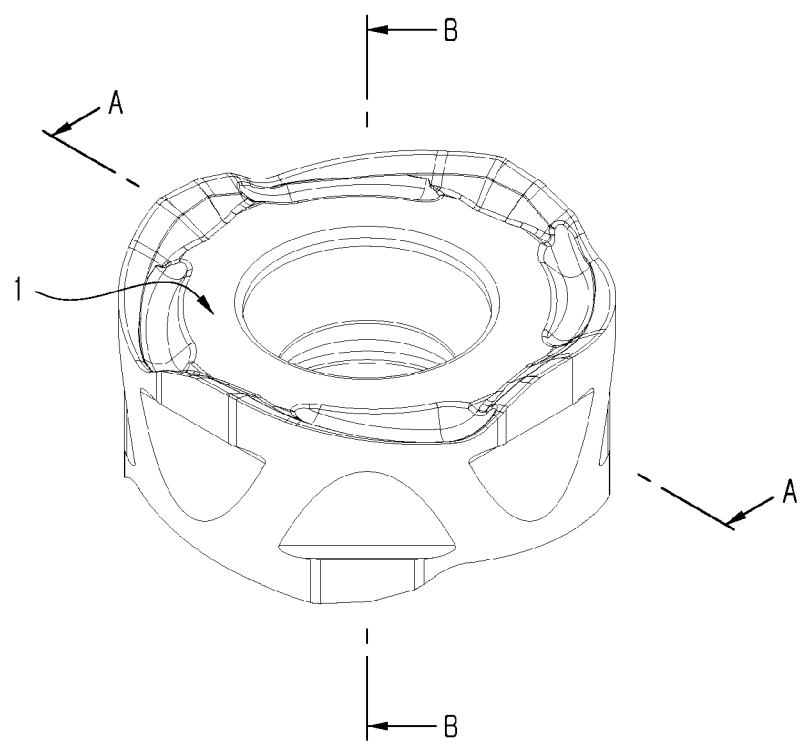
FIG. 2 is a perspective view of the cutting insert of FIG. 1.

With this, as illustrated in FIGS. 1B and 2, the fastening surface 421 of the present cutting insert 100 may be formed below the clearance surface 411 of the minor cutting edge 51, and these shapes may also be arranged equally along the lateral surface 4. Accordingly, the fastening surface 421 may always be located below the minor cutting edge 51, and with this, a uniform fastening force with the cutting tool 200 can be ensured.

Figure 6:
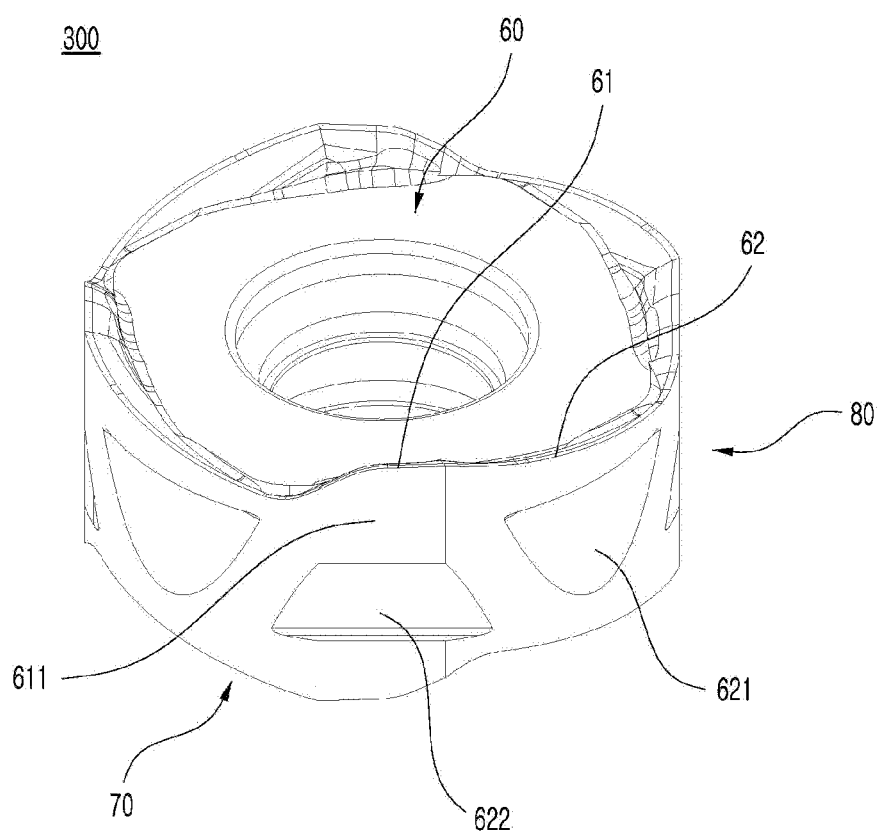
FIG. 6 illustrates an example of a cutting insert compared to the cutting insert of FIG. 1.
Figure 7A:
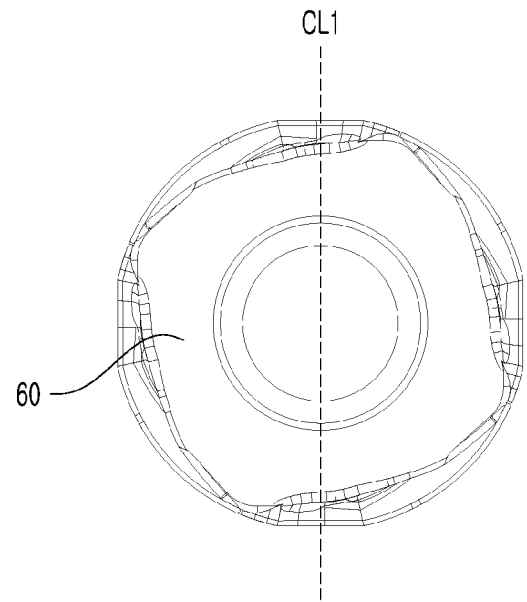
FIG. 7A is a top plan view of the cutting insert of FIG. 6.
Figure 7B:
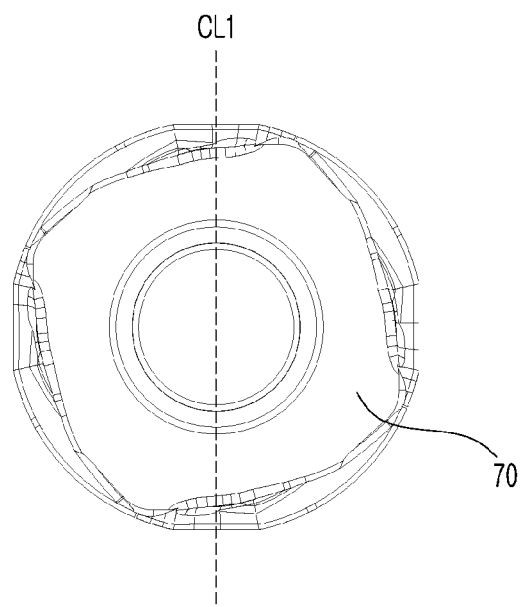
FIG. 7B is a bottom plan view of the cutting insert of FIG. 6.

On the other hand, in a cutting insert 300 of FIGS. 6 and 7, a minor cutting edge clearance surface 611 is extended downwardly from a minor cutting edge 61 in the height direction of the cutting insert 300, in which, unlike the present cutting insert 100, when a top surface 60 and a bottom surface 70 of the cutting insert 300 are arranged in the same manner without being rotated relative to each other, a fastening surface 621 when the top surface 60 acts as the rake surface and a fastening surface 622 when the bottom surface 70 acts as the rake surface have different shapes from each other. In addition, when the top surface 60 acts as the rake surface, the fastening surface 621 is located below the major cutting edge 61, and when the bottom surface 70 acts as the rake surface, the fastening surface 622 is located below the minor cutting edge 61. Accordingly, since the shapes, widths, and the like of the fastening surfaces 621 and 622 are formed differently from each other along the circumference of a lateral surface 80 of the cutting insert 300, it is difficult to ensure a uniform fastening force, and as a result, there is a problem that the fastening stability is lowered.

The present cutting insert 100 is provided with the minor cutting edge 51, and a major cutting edge 52 connected to the minor cutting edge 51 on the top surface 1 and the bottom surface 2, respectively. As illustrated in FIG. 1, these major cutting edges 52 are located one at each corner and are formed at intervals of 90°, and likewise, the minor cutting edges 51 are also formed at intervals of 90°. The major cutting edge 52 is extended from one end of the minor cutting edge 51 and is formed to be inclined downwardly to be closer toward the transverse central axis C1 of the cutting insert as being farther away from one end of the minor cutting edge 51. With this, it is possible to reduce the cutting resistance applied on the major cutting edge 52 during cutting process. In addition, as illustrated in FIG. 1A, the minor cutting edge 51 forms a straight line when the cutting insert is viewed from above the top surface 1 or the bottom surface 2. With this, the workpiece can be processed to an excellent surface roughness compared to curve.

In addition, referring to FIGS. 1B and 10, the minor cutting edge clearance surface 411 is provided on the lower side of the minor cutting edge 51 located on the top surface 1, and the fastening surface 421 is located just below the minor cutting edge clearance surface 411. With this, for example, when the cutting insert 100 is fastened to the cutting tool such that the top surface 1 acts as the rake surface, because the cutting tool 200 is in contact with the fastening surface 421 of the reverse positive type located on the lower side of the minor cutting edge 51, a wedge-shaped fastening structure ($\gamma < 90°$) can be achieved, thereby ensuring a very strong fastening force. Meanwhile, the lower side of the major cutting edge 52 is provided with the major cutting edge clearance surface 412.

Figure 9:
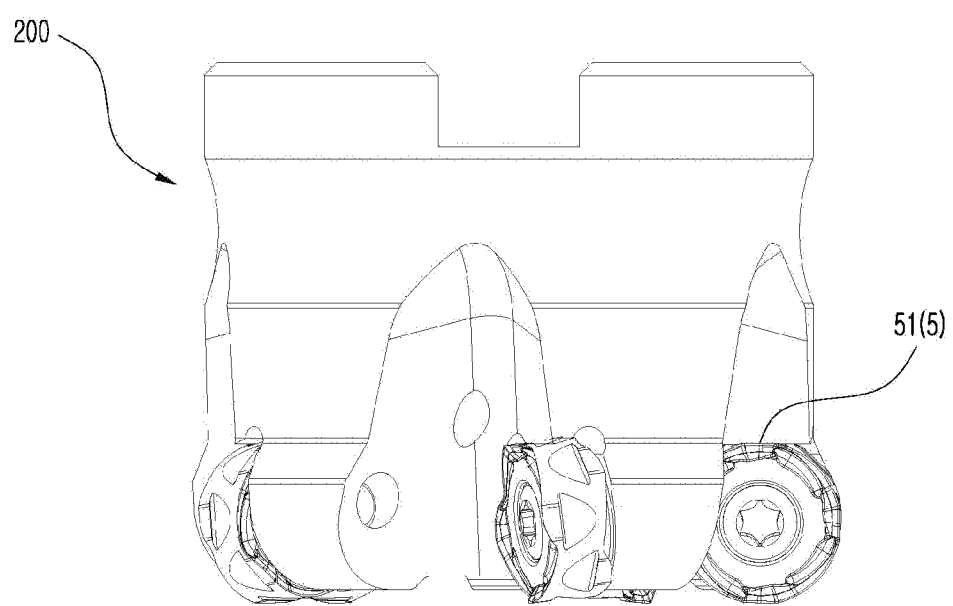
FIG. 9 is an exemplary view of the cutting insert of FIG. 1 mounted to the cutting tool.

In addition, as illustrated in FIG. 9, since the fastening surface 421 is located just below the minor cutting edge 51 (based on a direction into the page of FIG. 9), the user can easily check the fastening position of the cutting insert 100 with respect to the cutting tool 200 with naked eye, and thus can have improved working speed and working convenience.

Figure 10:
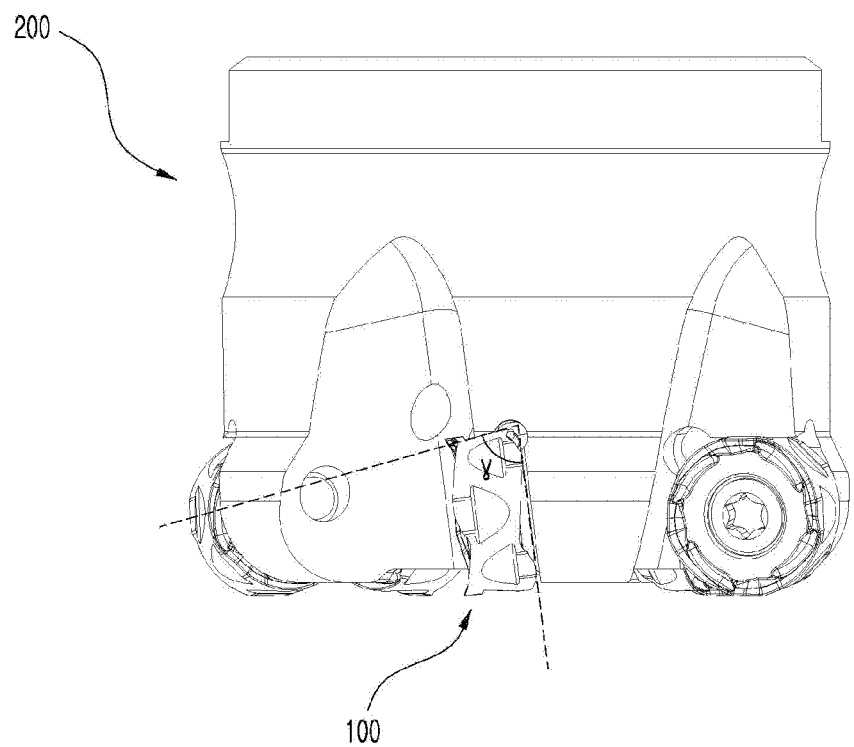
FIG. 10 illustrates the cutting insert of FIG. 1 wedge-coupled to the cutting tool of FIG. 9.
Figure 11:
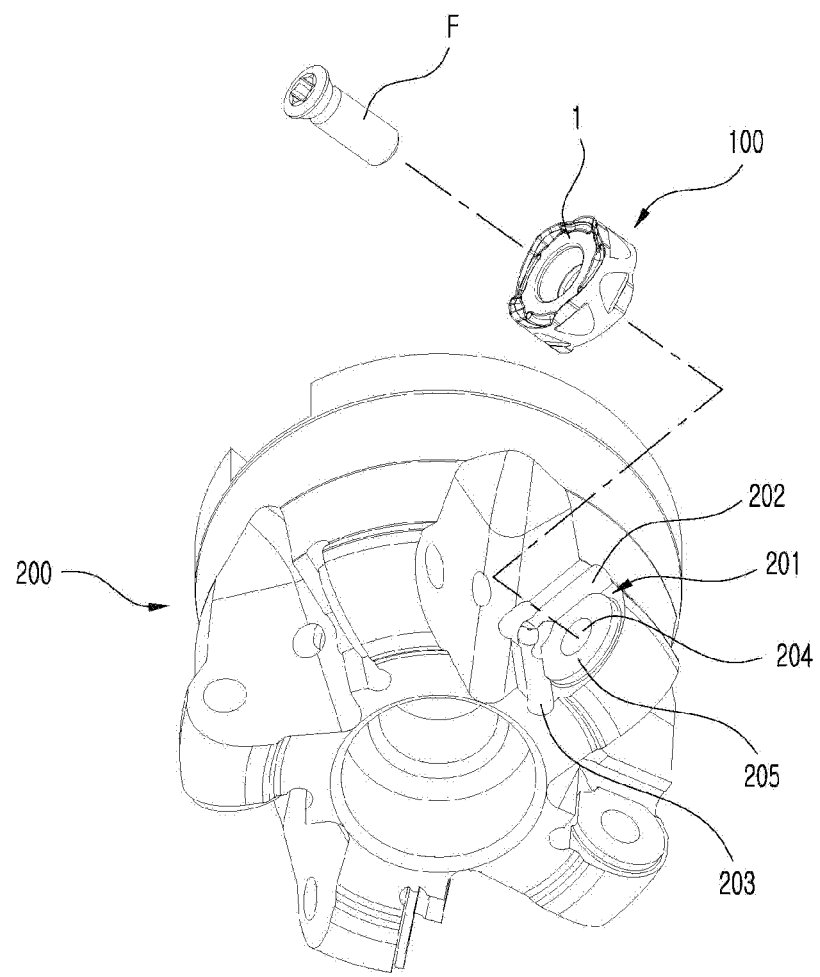
FIG. 11 is a detailed configuration diagram of the cutting tool of FIG. 9.
Figure 12:
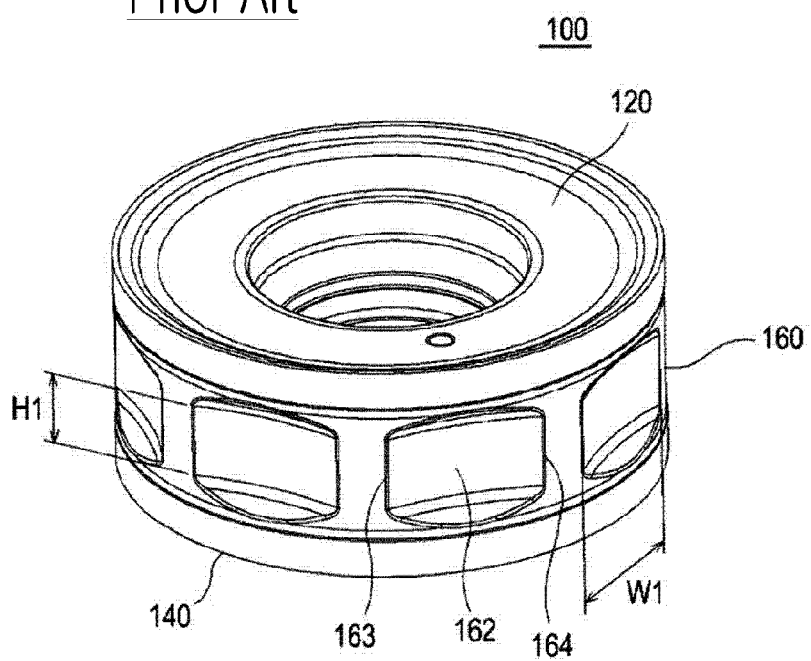
FIG. 12 illustrates a cutting insert of a prior art.

FIGS. 9 to 11 illustrate the cutting tool 200 equipped with the cutting insert 100 according to the embodiment of the present disclosure.

Referring to FIG. 11, a pocket part 201 of the cutting tool 200 equipped with the cutting insert 100 includes fastening surface seating parts 202 and 203 in contact with the fastening surface 421 of the cutting insert 100, respectively, upper and lower seating parts 205 in contact with the top surface 1 or the bottom surface 2 of the cutting insert 100, and a fastening hole 204 to receive the fastening bolt B.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

INDUSTRIAL APPLICABILITY

The cutting insert according to the present disclosure can be used for cutting process.

What is claimed is:
1. A circular double-sided cutting insert including a top surface, a bottom surface, a lateral surface, and a cutting edge, and mounted to a cutting tool, wherein
a plurality of clearance surfaces and a plurality of fastening surfaces are located on the lateral surface,
among the plurality of fastening surfaces, a fastening surface, which is brought into contact with the cutting tool when the cutting insert is mounted on the cutting tool, forms an acute angle with respect to the top surface or the bottom surface acting as a rake surface, the plurality of fastening surfaces are formed in even number which is 6 or more, half of the fastening surfaces are first fastening surfaces each of which forms an acute angle with respect to the top surface, and each of the first fastening surfaces is increased in width as being closer toward the top surface, and the other half of the fastening surfaces are second fastening surfaces each of which forms an acute angle with respect to the bottom surface, and each of the second fastening surfaces is increased in width as being closer toward the bottom surface, and the cutting edge includes a minor cutting edge and a major cutting edge connected to the minor cutting edge, and the major cutting edge is extended from one end of the minor cutting edge and is inclined downward to be closer toward a transverse central axis of the cutting insert as being farther away from the one end of the minor cutting edge, wherein the first fastening surfaces and the second fastening surfaces alternate with one other, and each of the first fastening surfaces is disposed directly adjacent to each of the second fastening surfaces with no other fastening surface disposed therebetween, wherein a minor cutting edge clearance surface is provided below the minor cutting edge, and the fastening surface is located directly below the minor cutting edge clearance surface, wherein the minor cutting edge clearance surface maintains a constant width as it extends from the top surface toward the bottom surface, and the minor cutting edge clearance surface forms a right angle with respect to the transverse central axis of the cutting insert.

2. The cutting insert according to claim 1, wherein a transition section is formed at a boundary between the plurality of fastening surfaces and the plurality of clearance surfaces such that the plurality of fastening surfaces form a step with the plurality of clearance surfaces.

3. The cutting insert according to claim 2, wherein the fastening surface at an end opposite the transition section is connected to a surface of the cutting insert without a step.

4. The cutting insert according to claim 1, wherein the bottom surface of the cutting insert as viewed from the bottom surface has a shape of being relatively rotated by a predetermined angle about a longitudinal central axis of the cutting insert with respect to the top surface of the cutting insert as viewed from the top surface.

5. The cutting insert according to claim 4, wherein the predetermined angle is 45 degrees.

6. The cutting insert according to claim 1, wherein the minor cutting edge is a straight line when the cutting insert is viewed from the top surface or the bottom surface.

7. A cutting tool equipped with the cutting insert according to claim 1.

* * * * *